D. HEATON.

BUTTON FASTENING.

No. 7,193. Reissued June 27, 1876.

WITNESSES:

Chas. C. Bishop

Frank Burnham.

INVENTOR.

David Heaton,

Per Parker H. Sweet & Co

ATTORNEYS.

N. PETERS, PHOTO-LITHOGRAPHER, WASHINGTON, D. C.

UNITED STATES PATENT OFFICE.

DAVID HEATON, OF PROVIDENCE, RHODE ISLAND.

IMPROVEMENT IN BUTTON-FASTENINGS.

Specification forming part of Letters Patent No. 153,220, dated July 21, 1874; reissue No. 7,193, dated June 27, 1876; application filed August 25, 1875.

*To all whom it may concern:*

Be it known that I, DAVID HEATON, of Providence, in the county of Providence and State of Rhode Island, have invented certain new and useful Improvements in Button-Fasteners; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to new and useful improvements in the construction of the button-fastener for which Letters Patent were granted to me under date of July 16, November 19, and December 10 of 1872, and numbered 129,474, 133,223, and 133,857, respectively.

My improvements consist in constructing the metallic connection or fastener in such a manner as to provide a staple to receive the shank of an ordinary button, for attaching the same to different articles of wearing apparel. It also consists in so constructing the metallic connection as to form a flat plate or table on both sides of the fabric to which it is attached; and it further consists in constructing the penetrating-prongs of the fastener with "lancet" points, the object being, generally, to produce a more substantial and a better and cheaper connection than those hitherto in use for the same purpose.

Figure 1:
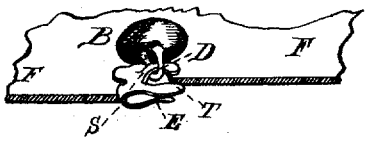
Figure 2:
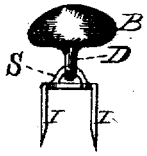
Figure 3:
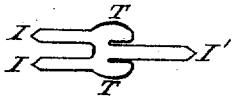
Figure 4:
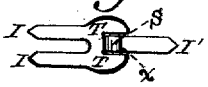
Figure 5:
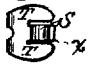
Figure 6:
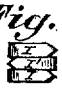

Referring to the drawings, Figure 1 is a perspective view of a button secured to a fabric by my improved connection or fastener. Fig. 2 is an upright view or elevation of the same. Fig. 3 is a plan view of the sheet-metal blank from which the connection or fastener is made. Fig. 4 is a similar view, with the staple S formed for receiving the shank or staple D of the button. Fig. 5 is a top view of the complete fastener without a button, showing the staple S and the top of the table T; and Fig. 6 is a view of the clinched prongs or spurs I, which form a second table on the back part of the fabric.

Similar letters of reference occurring on the several figures indicate corresponding parts.

In the drawings, B represents an ordinary button, having the usual staple or shank D, and S represents the staple of the metallic connection. T is the upper table, and E is the under table, of said connection, on opposite sides of the fabric F. The said metallic connection is first cut as a blank from sheet metal, in the form shown in Fig. 3, with the upper table composed of the two wings T T, and three parallel fastening-prongs, I I I′, extending, two in one direction, and the third, I′, in the opposite direction from said table. The prong I′ is longer, and extends through the center of the table, where the loop or staple S is formed in it, as shown in Fig. 4. All the said prongs are bent down at right angles from the edge of the table T, by which a portion of the longer prong I′, at *x*, is disposed in line with the table T, and forms part of it. The prongs I I′ are cut bevel-pointed, and thinned to an edge at the point, as shown in Fig. 2, to readily pierce the material of the apparel, after passing through which the said prongs are bent back, and made to enter the material again from the back part, by which operation a smoother and more efficient clinching of the prongs is obtained.

The prongs are preferably cut tapering at the end, as shown in Figs. 3 and 4, from sheet metal, as before mentioned, and left just as thick at the end which is to enter the material as elsewhere, a further operation being performed afterward upon their ends, by which they are made thin and sharp at the edge, as shown in Fig. 2, while the remaining part of the prongs is left its original thickness.

The object of the wings T T, forming the upper table, is to act as a shield to protect the parts around the button-holes from wearing. The under table E performs the office of a shield, also, to protect the wearing apparel underneath, and to prevent chafing and hurting the person, as the ordinary prongs, by forming bunches or protruding from the under surface, are liable to do. In the present instance the tables T and E, being directly opposite each other on opposite sides of the fabric, mutually give a broad, positive, firm gripe to the fabric, holding it between them as in a vise.

The advantage of the metallic connection constructed with two of the fastening-prongs extending in one direction, and the third in the opposite direction, in line with the space between the two first, and all parallel with each other, is, that in cutting the blank *a* great saving is effected, because the whole blank can be cut from the narrowest limit of the sheet; and, besides, the single prong I′ can be cut in succession from the metal between the other two prongs in producing such blank, with a saving of at least one-third of the stock. Another advantage is, that the ordinary button may, by said connection, be readily attached by the simplest mechanism, and by most unskillful persons, to any article of wearing apparel in the most durable and effective manner.

Having thus described my invention, what I claim as my invention, and desire to secure by Letters Patent, is—

A button-fastener constructed as hereinbefore described, having the wings T T, staples S, and prongs I I I′, thinned to an edge at their points, all arranged to operate substantially in the manner described and shown.

In testimony that I claim the foregoing as my own invention I hereby affix my signature in presence of two witnesses.

DAVID HEATON.

Witnesses:
JOSHUA WILBOUR,
B. A. JACKSON.